United States Patent
Salit et al.

(10) Patent No.: US 9,212,912 B1
(45) Date of Patent: Dec. 15, 2015

(54) RING LASER GYROSCOPE ON A CHIP WITH DOPPLER-BROADENED GAIN MEDIUM

(71) Applicant: Honeywell International Inc., Morristown, NJ (US)

(72) Inventors: Mary K. Salit, Plymouth, MN (US); Earl Thomas Benser, Chisago City, MN (US); Kenneth Salit, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 14/574,695

(22) Filed: Dec. 18, 2014

Related U.S. Application Data

(60) Provisional application No. 62/068,430, filed on Oct. 24, 2014.

(51) Int. Cl.
*G01C 19/72* (2006.01)
(52) U.S. Cl.
CPC .................................... *G01C 19/727* (2013.01)
(58) Field of Classification Search
CPC ...... G01C 19/727; G01C 19/72; G01C 19/66; G01C 19/64; H01S 5/1071
USPC ......................................................... 356/461
See application file for complete search history.

(56) References Cited

U.S. PATENT DOCUMENTS

| | | | |
|---|---|---|---|
| 4,440,498 A | 4/1984 | Sheem | |
| 4,470,701 A * | 9/1984 | Smith | ............................ 356/467 |
| 4,479,715 A | 10/1984 | Sheem | |
| 4,514,088 A | 4/1985 | Coccoli | |
| 4,572,670 A | 2/1986 | Frederickson | |
| 4,735,506 A | 4/1988 | Pavlath | |

(Continued)

FOREIGN PATENT DOCUMENTS

| | | |
|---|---|---|
| EP | 0268444 | 5/1988 |
| EP | 2573517 | 3/2013 |
| WO | 9400735 | 1/1994 |

OTHER PUBLICATIONS

Brambilla, "Optical fibre nanowires and microwires: a review", "Journal of Optics", Mar. 17, 2010, pp. 1-19, Publisher: Institute of Physics (IOP) Publishing.

(Continued)

*Primary Examiner* — Tarifur Chowdhury
*Assistant Examiner* — MD Rahman
(74) *Attorney, Agent, or Firm* — Fogg & Powers LLC

(57) ABSTRACT

A laser gyroscope comprising includes a first solid waveguide; a gain medium interaction region where light traveling through the first solid waveguide interacts with non-solid Doppler-broadened gain medium molecules positioned outside of the first solid waveguide; at least one medium exciter configured to excite the non-solid Doppler-broadened gain medium at the gain medium interaction region, wherein the excited non-solid Doppler-broadened gain medium induces first and second laser fields within the first solid waveguide, wherein the first laser field travels in a clockwise direction within the first solid waveguide and the second laser field travels in a counter-clockwise direction within the first solid waveguide; and a photodetector communicatively coupled to the first solid waveguide and configured to detect the portions of the first and second laser fields.

18 Claims, 3 Drawing Sheets

(56) References Cited

U.S. PATENT DOCUMENTS

| | | | |
|---|---|---|---|
| 4,820,008 A | 4/1989 | Malvern | |
| 4,902,086 A | 2/1990 | Henry et al. | |
| 5,007,695 A | 4/1991 | Chang | |
| 5,237,331 A * | 8/1993 | Henderson et al. | 342/54 |
| 5,325,174 A | 6/1994 | Danko | |
| 5,327,448 A | 7/1994 | Holonyak, Jr. et al. | |
| 5,386,288 A * | 1/1995 | Martin | 356/467 |
| 5,403,775 A | 4/1995 | Holonyak, Jr. et al. | |
| 5,555,088 A | 9/1996 | Valette | |
| 5,585,957 A | 12/1996 | Nakao et al. | |
| 5,689,358 A | 11/1997 | Nakao et al. | |
| 6,275,296 B1 | 8/2001 | Numai | |
| 6,304,329 B1 | 10/2001 | Nitta et al. | |
| 6,351,311 B1 | 2/2002 | Numai | |
| 6,493,089 B2 | 12/2002 | Numai | |
| 6,559,949 B1 | 5/2003 | Numai | |
| 6,603,557 B2 | 8/2003 | Mizutani | |
| 6,603,558 B2 | 8/2003 | Murakowski et al. | |
| 6,603,911 B2 | 8/2003 | Fink et al. | |
| 6,668,111 B2 | 12/2003 | Tapalian et al. | |
| 6,741,354 B2 | 5/2004 | Numai | |
| 6,785,003 B2 | 8/2004 | Mizutani et al. | |
| 6,842,548 B2 | 1/2005 | Loock et al. | |
| 6,891,149 B1 | 5/2005 | Lewis et al. | |
| 7,106,448 B1 | 9/2006 | Vawter et al. | |
| 7,148,683 B2 | 12/2006 | Xiang et al. | |
| 7,248,771 B2 | 7/2007 | Schmidt et al. | |
| 7,268,546 B2 | 9/2007 | Xiang et al. | |
| 7,276,902 B1 | 10/2007 | Xiang et al. | |
| 7,282,911 B2 | 10/2007 | Xiang et al. | |
| 7,336,859 B2 | 2/2008 | Sanders | |
| 7,804,600 B1 | 9/2010 | Smith | |
| 7,835,008 B2 | 11/2010 | Harayama et al. | |
| 8,031,343 B2 | 10/2011 | Carothers et al. | |
| 8,514,400 B2 | 8/2013 | Mohageg et al. | |
| 8,687,198 B2 | 4/2014 | Salit et al. | |
| 2002/0021447 A1 | 2/2002 | Mizutani et al. | |
| 2002/0030822 A1 | 3/2002 | Mizutani | |
| 2002/0033950 A1 | 3/2002 | Numai | |
| 2002/0176087 A1 | 11/2002 | Numai | |
| 2003/0007715 A1 | 1/2003 | Loock et al. | |
| 2003/0020918 A1 | 1/2003 | Murakowski et al. | |
| 2003/0206693 A1 | 11/2003 | Tapalian et al. | |
| 2004/0196037 A1 | 10/2004 | Xiang et al. | |
| 2007/0085541 A1 | 4/2007 | Xiang et al. | |
| 2007/0090836 A1 | 4/2007 | Xiang et al. | |
| 2007/0116080 A1 * | 5/2007 | Chen | 372/73 |
| 2007/0247147 A1 | 10/2007 | Xiang et al. | |
| 2008/0037027 A1 | 2/2008 | Harayama et al. | |
| 2009/0154872 A1 | 6/2009 | Sherrer et al. | |
| 2009/0226129 A1 | 9/2009 | Kuipers et al. | |
| 2010/0060388 A1 | 3/2010 | Ueda | |
| 2011/0221081 A1 | 9/2011 | Wang et al. | |
| 2013/0088720 A1 | 4/2013 | Sorrentino et al. | |
| 2014/0307997 A1 | 10/2014 | Bar et al. | |

OTHER PUBLICATIONS

Fang et al., "Electrically pumped hybrid AIGaInAs-silicon evanescent laser", "OPTICS EXPRESS", Oct. 2, 2006, pp. 9203-9210, vol. 14, No. 20, Publisher: Optical Society of America (OSA).

Jiang et al., "Microfiber knot dye laser based on the evanescent-wave-coupled gain", "Applied Physics Letters 90", Jun. 4, 2007, pp. 233501-1 to 233501-3, Publisher: American Institute of Physics.

Salit et al., "Ultra low-power, Zeno effect based optical modulation in a degenerate V-system with a tapered nano fiber in atomic vapor", "OPTICS EXPRESS", Nov. 7, 2011, pp. 22874-22881, vol. 19, No. 23, Publisher: Optical Society of America (OSA).

Stern et al., "Nanoscale light-matter interactions in atomic cladding waveguides", "Retrieved from http://www.nature.com/ncomms/journal/v4/n3/pdf/ncomms2554.pdf", Mar. 5, 2013, pp. 1-7, Publisher: Nature Communications.

Stern et al., "Transmission and time delay properties of an integrated system consisting of atomic vapor cladding on top of a micro ring resonator", "OPTICS EXPRESS", Dec. 17, 2012, pp. 28082-28093, vol. 20, No. 27, Publisher: Optical Society of America (OSA).

* cited by examiner

RING LASER GYROSCOPE ON A CHIP WITH DOPPLER-BROADENED GAIN MEDIUM

PRIORITY/BENEFIT CLAIM

This patent application claims the benefit of U.S. Provisional Patent Application No. 62/068,430, entitled "RING LASER GYROSCOPE ON A CHIP WITH DOPPLER-BROADENED GAIN MEDIUM" filed Oct. 24, 2014, which is hereby incorporated herein by reference.

BACKGROUND

Optical gyroscopes are navigation instruments used to measure rotation rates about an axis of rotation. Light travels through optical gyroscopes in both a clock-wise ("CW") and a counter clock-wise ("CCW") direction. When an optical gyroscope is stationary, a beam of light traveling through the cavity in the CW direction has the same frequency as a beam of light traveling through the cavity in the CCW direction. When the optical gyroscope is rotating, the frequency of the CW beam is different than that of the CCW beam. Utilizing the Sagnac effect, the frequency difference between a first beam traveling in the CW direction and a second beam traveling in the CCW direction is calculated. This is called resonant frequency splitting. The rotation rate of the optical gyroscope is proportional to the frequency difference between the CW beam and the CCW beam.

SUMMARY

A laser gyroscope comprising includes a first solid waveguide; a gain medium interaction region where light traveling through the first solid waveguide interacts with non-solid Doppler-broadened gain medium molecules positioned outside of the first solid waveguide; at least one medium exciter configured to excite the non-solid Doppler-broadened gain medium at the gain medium interaction region, wherein the excited non-solid Doppler-broadened gain medium induces first and second laser fields within the first solid waveguide, wherein the first laser field travels in a clockwise direction within the first solid waveguide and the second laser field travels in a counter-clockwise direction within the first solid waveguide; and a photodetector communicatively coupled to the first solid waveguide and configured to detect the portions of the first and second laser fields.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1A:
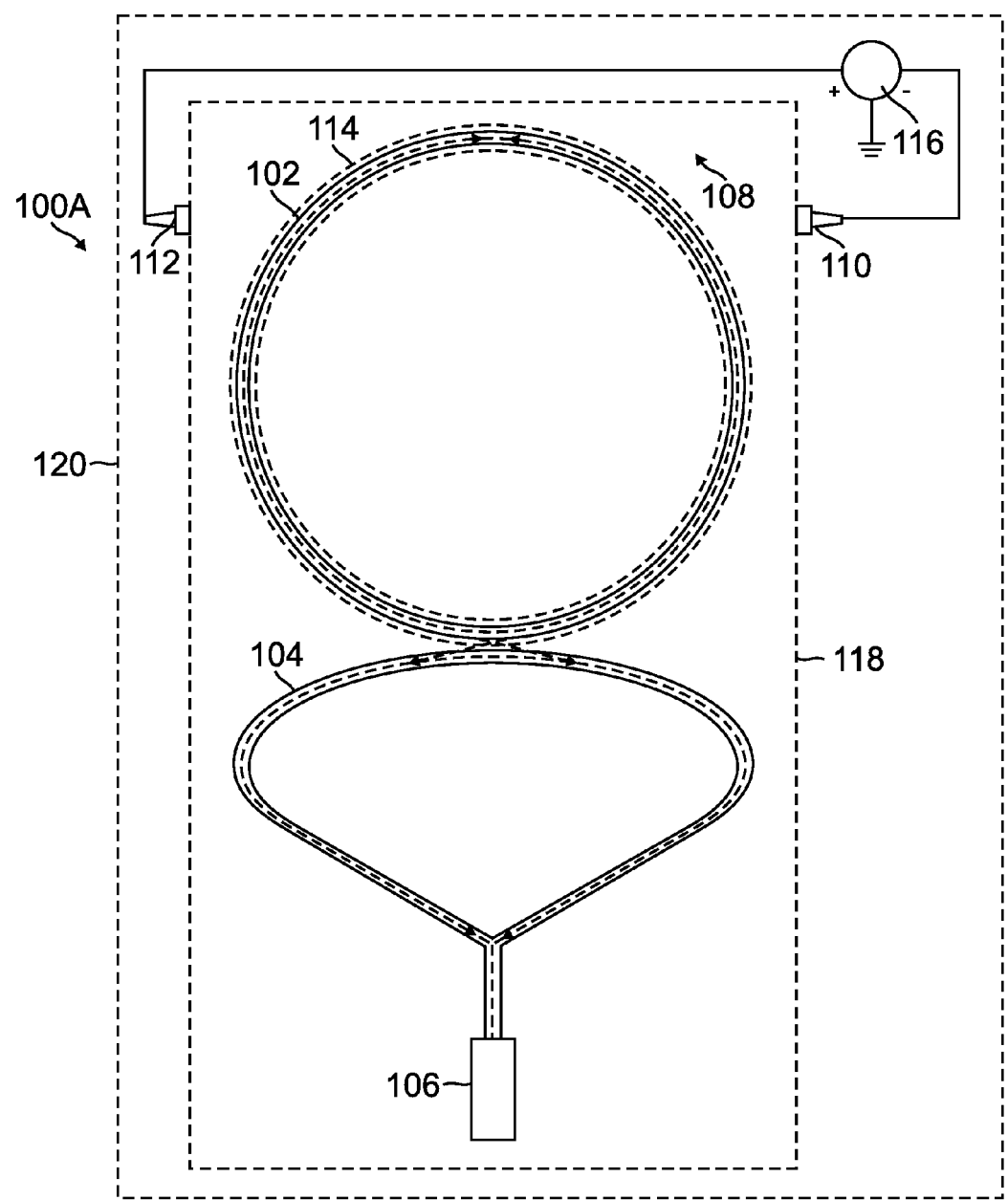
FIG. 1A is a block diagram depicting an exemplary embodiment of a ring laser gyroscope on a chip where light interacts with a Doppler-broadened gain medium through an evanescent mode outside of a first solid waveguide.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Ring laser Gyroscopes (RLGs) have some disadvantages including weight and cost, which excludes them for some applications. If RLGs could be micro-fabricated on a chip, the cost and weight could be reduced. An obstacle to doing this is the incompatibility of chip-scale architectures with gaseous optical gain media. For gaseous media, oppositely directed beams detuned in frequency from the center of the gain profile interact with different atoms due to the Doppler effect, preventing unwanted non-linear interactions between the oppositely directed beams. This is important for stable gyro operation. This disclosure describes means for fabricating an RLG using a waveguide on a chip, while still taking advantage of the Doppler effect in gaseous media to prevent non-linear interactions.

In exemplary embodiments, light is guided within either a rigid waveguide structure micro-fabricated on a chip or guided within an optical fiber. A waveguide fabricated in the shape of a ring can constitute an optical ring resonator. In the presence of optical gain, a ring resonator can become a ring laser. However, in general light which is configured to propagate within a waveguide will not interact with a gas medium outside the waveguide. Accordingly with traditional waveguide structures, the optical gain cannot come from a gas. Without the "Doppler broadening" of a gas medium, however, the laser usually does not lase simultaneously in both directions. Rather, one beam "saturates" the gain medium, reducing the optical gain available for the beam propagating in the other direction such that it cannot lase.

By incorporating a gas medium as the optical gain element in a way that allows it to interact with the light guided by the waveguide, this invention enables a waveguide RLG which does lase in both directions, without unwanted interactions between the two counter-propagating lasing modes. There are at least two possible solutions to the problem of achieving bi-directional lasing in a waveguide which involve incorporating gain from a gas medium into a waveguide resonator.

FIG. 1A is a block diagram depicting an exemplary embodiment of a ring laser gyroscope on a chip 100A where light interacts with a Doppler-broadened gain medium through an evanescent mode outside of a first solid waveguide. Generally, the first methodology is to taper the waveguide to dimensions small enough to force a substantial portion of the energy of the field into the evanescent mode, which is still guided by the waveguide, but with much of the field actually existing outside of the waveguide structure. This evanescent field can interact with atoms in a non-solid Doppler-broadened gain medium surrounding the waveguide enabling Doppler-broadened gain. As the gain exceeds the round-trip losses in the waveguides, a waveguide implementation of a gas-medium RLG with reduced loss and backscatter over the coupling-to-free-space approach is enabled.

Figure 1B:
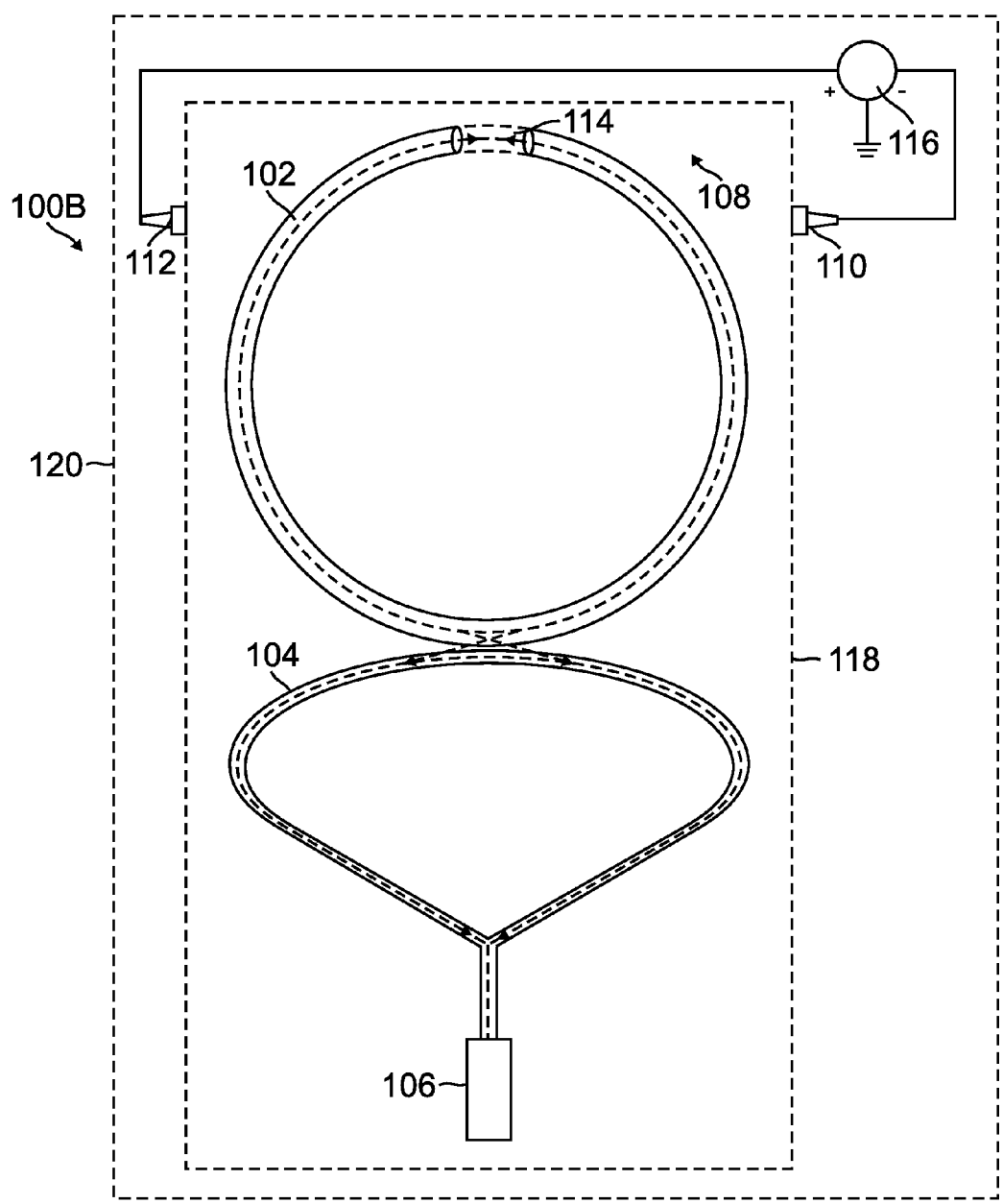
FIG. 1B is a block diagram depicting another exemplary embodiment of a ring laser gyroscope on a chip where light interacts with a Doppler-broadened gain medium through a gap in a first solid waveguide.

FIG. 1B is a block diagram depicting another exemplary embodiment of a ring laser gyroscope on a chip 100B where light interacts with a Doppler-broadened gain medium through a gap in a first solid waveguide. Generally, the second methodology is to couple the light out of the waveguide and into free space for some section of the resonator path, allowing it to interact with the gain in that section and then couple it back into the waveguide on the other side. Embodiments according to this methodology present several challenges. First, back reflections within gyro resonators are a major source of error, and must be minimized. Coupling into free space and back out of it is very challenging to achieve without significant back reflection. Second, round trip optical gain must exceed loss if the resonator is to lase, and coupling out of and then back into the waveguide without significant losses is also challenging.

The term "resonator" used herein includes closed optical paths filled with vacuums, air, other gases, or solids. Resonators can be formed waveguides having closed optical paths, including waveguides deposited on substrates, solid core fibers, and hollow core fibers. Resonators can be either active resonators that lase (such as laser cavities) or passive resonators that do not lase.

Optical Gyroscopes include Fiber Optic Gyroscopes (FOG), free space optical gyroscopes such as Ring Laser Gyroscopes (RLGs), and Waveguide Optical Gyroscopes (WOGs). While an optical fiber is a waveguide, and hence a FOG is a "waveguide optical gyroscope", the word "waveguide" is more commonly used to refer to a fiber-like structure patterned lithographically on a rigid substrate, in which light is guided across the surface of that substrate. Traditional Ring Laser Gyroscopes (RLGs) include hollow resonator paths with free space between mirrors. In traditional RLGs, the light is not guided, as in a substrate deposited waveguide or fiber, rather it propagates through empty space and is directed around a closed path by mirrors. Fiber optic gyroscopes guide light within a fiber. Waveguides deposited on a substrate generally are a thin piece of material (often a glass) that is fabricated directly on a substrate (such as a silicon substrate). Although such waveguides can be massproduced at very low cost and provide some performance advantages in terms of vibrational robustness and simplified temperature control, as well as the potential for integration of various optical gyro components on a single chip, they have until recently been poor candidates for use in optical gyroscopes because of the high optical loss and short total path lengths. However, new fabrication techniques developed recently have enabled low loss (such as less than 0.05 dB/m) waveguides with tens of meters of optical path length on a single substrate.

Some approaches to making Integrated Waveguide Optical Gyroscopes (IWOGs) include putting a fiber optic gyroscope architecture on a waveguide on a chip or putting a Ring Laser Gyroscope (RLG) architecture on a chip with waveguides. One problem with a chip-based RLG is that a gas medium needs to be used. Attempting to do a Ring Laser Gyroscope (RLG) where the gain medium isn't a gas is extremely challenging due to the absence of Doppler broadening. Doppler broadening is the result of atoms that are traveling different directions or at different speeds sensing different optical frequencies as resonant the Doppler effect. This means in a gyroscope that if the counter-propagating resonance modes are detuned from the center of the Doppler profile (for example, detuned below resonance for the zero velocity group), then different atoms will see those fields being shifted by the Doppler effect to be the right frequency and will actually resonate with them (for example, counter-clockwise moving atoms see the clock-wise propagating field as on resonance, and clockwise moving atoms see the counter-clock-wise propagating field as on resonance). The fields each appear to be on resonance for those atoms that are moving at the correct speed and direction relative to the direction of propagation of the beam. Because the beams are propagating in opposite directions, those are different atoms. That means that the beams don't interact very much because they are interacting with totally different atoms, so the non-linear optics affects that can happen when two beams interact with the same atoms are minimized.

When the gain medium is not Doppler broadened gain, for example in the case of a solid semiconductor gain medium, the same atoms end up interacting with both fields. In that case, one field can experience gain such that the field gets bigger until it saturates the gain medium and there is no gain left for the other field to experience. The other direction then won't lase. This is sometimes referred to as "mode competition". Mode competition is one reason that solid state RLGs (and/or RLGs on a chip) have historically not worked. Accordingly it is desirable to have an RLG on a chip using waveguides and a Doppler broadened gain medium, such as a gas, plasma, or liquid.

FIG. 1A is a block diagram depicting an exemplary embodiment of a ring laser gyroscope on a chip 100A where light interacts with a Doppler-broadened gain medium through an evanescent mode outside of a first solid waveguide. The ring laser gyroscope on a chip 100A includes a first solid waveguide 102, an optional second solid waveguide 104, a photodetector 106, a non-solid Doppler-broadened gain medium 108 and at least one medium exciter (such as electrode 110 and electrode 112). In exemplary embodiments, the first solid waveguide 102 is circular shaped with no gaps. The ring laser gyroscope on a chip 100A includes a gain medium interaction region 114 where light traveling through the first solid waveguide 102 interacts with the non-solid Doppler-broadened gain medium 108 molecules positioned outside of the first solid waveguide 102.

In exemplary embodiments, the non-solid Doppler-broadened gain medium 108 is at least one of a gas and a plasma. A plasma is a gas that includes ionized atoms. It is understood that while the term gas is used primarily in this disclosure, this is meant to include plasmas as well. In exemplary embodiments, a gas implies only neutral atoms, while a plasma implies ions and electrons mixed in with the neutral atoms. In exemplary embodiments, a fully ionized plasma doesn't have any neutral atoms (only ions and electrons). In exemplary embodiments, a partially ionized plasma includes some ions and electrons but also includes some neutral atoms. In exemplary embodiments, the non-solid Doppler-broadened gain medium 108 is a Helium Neon ("HeNe") partially ionized plasma where the excited helium atoms collide with neon atoms which produce fluorescence and stimulated emission.

In exemplary embodiments, the non-solid Doppler-broadened gain medium 108 is contained in a chamber 118 over a substrate 120 that has the first solid waveguide 102 and the optional second solid waveguide 104 deposited on it. In exemplary embodiments, the height of this chamber 118 is configured to be at least as large as the evanescent field so that the evanescent field does not extend to or beyond the walls of the chamber 118. In exemplary embodiments, the chamber 118 as at least one millimeter in height above the substrate 120.

The at least one medium exciter is configured to excite the non-solid Doppler-broadened gain medium 108 at the gain medium interaction region 114. In exemplary embodiments, the at least one medium exciter applies a DC discharge where a high voltage is applied across the non-solid Doppler-broadened gain medium 108 and at some point it exceeds the breakdown voltage of the gas and the current starts to flow. In exemplary embodiments, the at least one medium exciter includes electrode 110 and electrode 112, both powered by a power source 116. The power source 116 applies a current between electrode 110 and electrode 112. In one non-limiting exemplary embodiment, electrode 110 is a cathode and electrode 112 is an anode. In other embodiments, different amounts of either cathodes, anodes, or both are included in the at least one medium exciter. The non-solid Doppler-broadened gain medium 108 is thusly excited at the gain medium interaction region 114. The excited non-solid Doppler-broadened gain medium 108 induces first and second laser fields within the first solid waveguide 102, wherein the first laser field travels in a clockwise direction within the first solid waveguide 102 and the second laser field travels in a counter-clockwise direction within the first solid waveguide 102.

In exemplary embodiments, the ring laser gyroscope on a chip 100A is a Helium Neon (HeNe) ring laser gyroscope using a plasma gain medium. In exemplary embodiments, Neon atoms are exited into an excited state by the at least one medium exciter so that they provide gain. In exemplary embodiments, highly accelerated electrons start to collide with Neon atoms and ionize them. They also collide with and excite Helium atoms and some of those excited Helium atoms collide with other neutral Neon atoms and excites them to the right state. This process of electrons colliding with and exciting atoms leads to the population inversion required for optical gain.

In some exemplary embodiments, Helium Neon ring laser gyroscopes use a large DC voltage to accelerate those electrons. In exemplary embodiments using DC discharge, a voltage, frequency, power, and gap between electrodes are selected to get excitation. In other exemplary embodiments, an RF discharge is used instead of a DC discharge, obviating the need for vacuum feed-throughs for any electrodes, such as electrode 110 and electrode 112. In exemplary embodiments, the chamber 118 that contains the non-solid Doppler-broadened gain medium 108 needs to effectively be vacuum chambers because the pressure of the non-solid Doppler-broadened gain medium 108 (such as Helium Neon) is low. In exemplary embodiments, a good seal is required to keep oxygen, nitrogen, etc. from the atmosphere out of the chamber 118. In exemplary embodiments using DC discharge, the electrodes (such as electrode 110 and electrode 112) need to be in contact with the non-solid Doppler-broadened gain medium and the chamber 118 needs to be sealed around those electrodes (such as electrode 110 and electrode 112). In exemplary embodiments, a vacuum feed-through is used to get the conductor for the electrode (such as electrode 110 and electrode 112) in a DC discharge in through the side of the wall of the vacuum cell. That seal represents an opportunity for leaks and it is not ideal.

In other exemplary embodiments, the ring laser gyroscope on a chip 100A is a radio frequency (RF) laser gyroscope that uses radio frequency (RF) discharge rather than DC discharge. In exemplary embodiments of the ring laser gyroscope on a chip 100A with an RF discharge, the electrodes (such as electrode 110 and/or electrode 112) for RF discharge are placed underneath the first solid waveguide 102 on the substrate 120 (such as depositing some metal on the underside of the silicon substrate) and then the chamber 118 caps/covers that and is sealed to the substrate 120 and contains the non-solid Doppler-broadened gain medium 108. In exemplary embodiments, the chamber 118 is a smaller cover to contain the non-solid Doppler-broadened gain medium 108. In exemplary embodiments, there might be approximately one millimeter gap between the substrate 120 surface and the sealed cover (such as a glass cap) of the chamber 118. In exemplary embodiments, another electrode (such as electrode 110 or electrode 112) is placed on top of that sealed cover and RF electromagnetic radiation is driven between the pair of electrodes (such as electrode 110 and/or electrode 112 through the substrate 120, the first solid waveguide 102, and the chamber 118. In exemplary embodiments using Helium Neon gas in the chamber 118, those voltages from the RF would result in exciting the Neon atoms to cause optical gain. Accordingly, with an RF discharge the electrodes can be on the outside of the package, obviating the need for feed-throughs, seals, etc. to avoid leaks.

In other exemplary embodiments, the excitation of the gain medium is not limited to electronic excitation. Some optical gain media are excited optically, for instance. In some exemplary embodiments the gas medium is optically pumped. For example, a diode pumped alkali laser may use Rubidium as the gas that is optically pumped with a diode laser as the pump. One disadvantage of this approach is that it requires an additional laser.

It is not easily evident that the non-solid Doppler-broadened gain medium 108 is compatible with on-chip waveguides (such as the first solid waveguide 102) because a field trapped inside of some solid waveguide material cannot interact with a gas, liquid, or plasma. However, when the transverse dimensions of the first solid waveguide 102 are made small enough (thinner) compared with the wavelength of the light, an evanescent field of the beam can extend beyond the boundaries of the waveguide and interact with atoms outside of the waveguide in the gain medium interaction region 114. In a particular implementation, the first solid waveguide 102 could be 400 nanometers across with a wavelength of light around 780 nanometers. In exemplary embodiments, the first solid waveguide 102 has different widths depending on the wavelength of the light used and the index of the material used to create the first solid waveguide 102. In exemplary embodiments, the spatial mode of the first solid waveguide 102 (the shape of the beam that is guided by the first solid waveguide 102) includes a large electric field outside of the first solid waveguide 102, known as the "evanescent field". The location of the evanescent field is still determined by the shape and direction of the first solid waveguide 102 and this evanescent field will couple back into the first solid waveguide 102 if the dimensions of the first solid waveguide 102 are tapered back up (wider).

When the non-solid Doppler-broadened gain medium 108 surrounds the first solid waveguide 102, which is thin enough to have a significant evanescent field, the atoms in the non-solid Doppler-broadened gain medium 108 medium interact with the evanescent field allowing the guided mode of the light to experience gain due to the interactions with the non-solid Doppler-broadened gain medium 108. Accordingly, light in the first solid waveguide 102 (such as a tapered on-substrate waveguide or a tapered fiber optic fiber) can interact with the non-solid Doppler-broadened gain medium 108 surrounding the first solid waveguide 102. Accordingly, with a non-solid Doppler-broadened gain medium 108 surrounding a thin section of the first solid waveguide 102, an evanescent field surrounding the thin section of the first solid waveguide 102 could enable creation of a Ring Laser Gyro (RLG) using the first solid waveguide 102 (such as an on-substrate waveguide or an optical fiber) using the non-solid Doppler-broadened gain medium 108. This configuration of the first solid waveguide 102 enables a waveguide RLG which makes use of the advantages of the non-solid Doppler-broadened gain medium 108. One benefit of this exemplary embodiment of the ring laser gyroscope on a chip 100A is that back reflections are less of a concern than other embodiments.

The first solid waveguide 102 (including either optical fiber or on-substrate waveguide) is generally solid. In exemplary embodiments, silica and/or silicon nitride are printed/deposited onto a substrate (such as a silicon chip) to make the first solid waveguide 102 (such as an optical fiber or on-substrate waveguide). In exemplary embodiments, the first solid waveguide 102 is tapered/thinned on either side of the gain medium interaction region 114 to enable light to couple into the evanescent mode and then back into the propagating mode. In exemplary embodiments, the non-solid Doppler-broadened gain medium 108 surrounds more portions of the waveguide that are not tapered/wider, but evanescent mode only interacts with the non-solid Doppler-broadened gain medium 108 where the first solid waveguide 102 is thin enough to have the evanescent mode extend outside of the first solid waveguide 102 to where the non-solid Doppler-broadened gain medium 108 is outside of the first solid waveguide 102.

In exemplary embodiments, the tapered/narrower section of the first solid waveguide 102 can remain tapered for its entire length (though this may be undesirable for practical reasons). In FIG. 1A, the evanescent mode is shown to extend outside of the first solid waveguide 102 for the entire length of the first solid waveguide 102. Thusly, the gain medium interaction region 114 is around the entire length of the first solid waveguide 102. In other exemplary embodiments, the gain medium interaction region 114 only surrounds a portion of the length of the first solid waveguide 102 where the first solid waveguide 102 is thin enough and/or tapered such that the evanescent field extends outside of the first solid waveguide 102 and interacts with the non-solid Doppler-broadened gain medium 108. In these embodiments, the light is inside other portions of the first solid waveguide 102 waveguide that are wider/bigger/not-tapered.

In exemplary embodiments, the taper/width of the portion of the first solid waveguide 102 that causes the evanescent field to extend outside the first solid waveguide 102 is a different taper/width than that of the portion of the first solid waveguide 102 used to couple with the optional second solid waveguide 104. In exemplary embodiments, the diameter of the tapered section of the first solid waveguide 102 for coupling light between the first solid waveguide 102 and the optional second solid waveguide 104 is configured such that the evanescent field from the first solid waveguide 101 couples into the guided mode of the optional second solid waveguide 104. In exemplary embodiments, both the first solid waveguide 102 and the optional second solid waveguide 104 are on the single substrate 120. In other embodiments, the first solid waveguide 102 and the optional second solid waveguide 104 are on different substrates and/or one or both of the first solid waveguide 102 and the optional second solid waveguide 104 are implanted as optical fiber. In exemplary embodiments including the optional second solid waveguide 104, the counter propagating fields can be combined with a readout optical coupler (such as a Y-coupler or another type of waveguide coupler). In exemplary implementations, evanescent coupling via the adjacent first solid waveguide 102 and the optional second solid waveguide 104 couples the light out of the first solid waveguide 102 into the optional second solid waveguide 104.

In other embodiments, the counter propagating fields are communicated to the photodetector 106 in other ways and/or through other components. In exemplary embodiments, there is no optional second solid waveguide 104. Instead, the light is coupled out of the first solid waveguide 102 in other ways and through other components, such as through tapered optical fibers, a scattering source positioned within the evanescent field of the first solid waveguide 102, or through a deliberate defect in the first solid waveguide 102. In exemplary embodiments once the light is coupled out of the first solid waveguide 102, the counter propagating fields can be combined in free space with a partially reflective mirror or other partially reflecting surface. In exemplary embodiments once the light is coupled out of the first solid waveguide 102, it can be combined in fiber with fiber optic couplers.

In exemplary embodiments, the length of the portion of the first solid waveguide 102 that is tapered/narrower such that the evanescent field interacts with the non-solid Doppler-broadened gain medium 108 in the gain medium interaction region 114 is selected so that there is enough gain from interaction of the light with the non-solid Doppler-broadened gain medium 108 to allow lasing. In exemplary embodiments, the gain is a function of the total length of the tapered/narrower portion of the first solid waveguide 102. In exemplary embodiments, there needs to be enough gain to overcome whatever losses are in the resonator. In exemplary embodiments, the length of this tapered/narrower portion of the first solid waveguide 102 (such as a fiber loop or an on-substrate waveguide) is as long as possible, even the entire length of the first solid waveguide 102, such as shown in FIG. 1A. In exemplary embodiments, the length of this tapered/narrower portion of the first solid waveguide 102 is limited by fragility introduced by the tapering/narrowing of the first solid waveguide 102.

In exemplary embodiments, the tapered/thinner section of the first solid waveguide 102 is small enough in diameter to result in a significant evanescent field over a long enough length of the first solid waveguide 102 to yield gain greater than loss. In exemplary embodiments, as the cross sectional area of the first solid waveguide 102 increases, the fraction of the field that is in the evanescent field goes down. Accordingly, if the cross-sectional area of the first solid waveguide 102 is quite large, there will be no evanescent field. In contrast, as the diameter of the first solid waveguide 102 is decreased, an increased percentage of light will be in the evanescent field. In exemplary embodiments, as you shrink the diameter of the first solid waveguide 102 down, it becomes more fragile and more easily broken or damaged by high optical intensities resulting from the small mode area. Accordingly, there are tradeoffs that need to be taken into account when determining the diameter and length of the tapered section of the first solid waveguide 102, how much light is required in the evanescent mode, and what risks there are to putting too much of the light in the evanescent mode.

In exemplary embodiments, the area where the first solid waveguide 102 and the optional second solid waveguide 104 is a coupler that imposes its own requirements on the dimensions and spatial modes of the two waveguides. In exemplary embodiments, the length of this tapered/narrower portion of the first solid waveguide 102 is limited because it is difficult to couple light from the first solid waveguide 102 into the optional second solid waveguide 104 when the first solid waveguide 102 is too narrow.

In exemplary embodiments, interaction between the light and the non-solid Doppler-broadened gain medium 108 is only required in the first solid waveguide 102 and not in the optional second solid waveguide 104. In exemplary embodiments, the optional second solid waveguide 104 (including the readout optical coupler) and the photodetector 106 are only used for read-out of the wavelengths of the counter propagating fields. In exemplary embodiments, the optional second solid waveguide 104 has a larger diameter (is thicker) than the portions of the optional second solid waveguide 104 having the tapered/thinner diameter and doesn't have any evanescent field interacting with the non-solid Doppler-broadened gain medium 108. In exemplary embodiments, the non-solid Doppler-broadened gain medium 108 also surrounds the optional second solid waveguide 104, but because the optional second solid waveguide 104 is larger in diameter in those sections, the light is all inside the optional second solid waveguide 104 and there is no (or negligible) evanescent field. In exemplary embodiments, the optional second solid waveguide 104 is not tapered/thinned as tapering there could potentially add some error mechanisms and noise sources in the readout of the wavelength of the counter propagating fields at the photodetector 106.

In exemplary embodiments, it is desirable to have enough light in the evanescent mode that there is interaction with the atoms of the non-solid Doppler-broadened gain medium 108 that are outside of the first solid waveguide 102, to create lasing. In an exemplary implementation, there could be 10% gain per pass from the atoms of the non-solid Doppler-broadened gain medium 108, such that every electric field that passes through that group of atoms gets 10% bigger. But, if only 10% of the light was in the evanescent mode where it could interact with the atoms of the non-solid Doppler-broadened gain medium 108, the total gain for the whole guided mode, which is only 10% interacting with the atoms of the non-solid Doppler-broadened gain medium 108, would be 10% of 10%, which is only 1% net gain. In exemplary embodiments, it is desirable to have enough light in that evanescent mode so that the product of the fraction that is in the evanescent mode and the fractional gain (which we will call the net gain) is bigger than the net loss for one round trip being guided by the first solid waveguide 102. In exemplary embodiments, it is desirable that the non-solid Doppler-broadened gain medium 108 does not react with an evanescent field surrounding the optional second solid waveguide 104. In exemplary embodiments, the non-solid Doppler-broadened gain medium 108 still surrounds the optional second solid waveguide 104, but the optional second solid waveguide 104 is just not thin enough in cross sectional diameter to have an evanescent field that interact with the non-solid Doppler-broadened gain medium 108 outside of the optional second solid waveguide 104.

In exemplary embodiments, the quantity of acceptable back scatter in the first solid waveguide 102 is calculated for a given performance level for the ring laser gyroscope on a chip 100A. In exemplary embodiments, a performance level for the ring laser gyroscope on a chip 100A is specified in angle random walk (ARW), which is related to the lock-in bandwidth of the ring laser gyroscope on a chip 100A. RLGs tend to experience "lock-in": for rotation rates below some minimum rate they don't give any output. The minimum rotation rate required for the gyro to give a measurable output is related to the backscatter. In embodiments, the performance level is related to lock-in and lock-in is related to backscatter. Accordingly, the performance level is related to backscatter. In exemplary embodiments, the relationship between backscatter and expected lock-in rate can be used to predict how much backscatter will be compatible with the desired performance goals for the ring laser gyroscope on a chip 100A.

In exemplary embodiments, the ring laser gyroscope on a chip 100A is magnetically dithered instead of mechanically dithered. Traditional RLGs are mechanically dithered in order to consistently provide rotation rates exceeding that lock-in rate. It is a disadvantage to have to do that in some applications due to the vibration of the moving parts, the added weight of a mechanical dither, etc. In exemplary embodiments, the ring laser gyroscope on a chip 100A using the first solid waveguide 102 and the optional second solid waveguide 104 allow magnetic dithering. In exemplary embodiments, an alternating current is used to create magnetic field that can differentially change the resonant frequency of the counter propagating fields through the waveguide through Faraday rotation and/or birefringence in the waveguide. In exemplary embodiments, the components used to create the magnetic field are deposited onto the substrate during fabrication. In other exemplary embodiments, the waveguide or a section of it is made from an electro-optically active material, so that the optical phase can be modulated with an electric field. This phase modulation may alter the interference condition for back-reflected light in such a way as to reduce the lock-in effect for small rotations without mechanical dither.

The embodiments of the ring laser gyroscope on a chip 100A described above use waveguides on a chip for the first solid waveguide 102 and optional second solid waveguide 104. In other embodiments, one or both of the first solid waveguide 102 and the optional second solid waveguide 104 are tapered optical fibers that are not attached to a solid surface. An optical fiber is a special case of a waveguide. A fiber is a cylindrical waveguide, while other on substrate waveguides are mostly different shapes, not cylinders. In exemplary embodiments, the term "fiber" is used for optical fibers while the term "waveguide" is used for a non-fiber waveguide. In exemplary embodiments where the first solid waveguide 102 is an optical fiber, the optical fiber is tapered down such that the non-solid Doppler-broadened gain medium 108 surrounding at least the tapered section of the optical fiber can interact with the evanescent mode guided by the optical fiber.

FIG. 1B is a block diagram depicting another exemplary embodiment of a ring laser gyroscope on a chip where light interacts with a Doppler-broadened gain medium through a gap in a first solid waveguide. The ring laser gyroscope on a chip 100B includes similar components and functionality to the various embodiments of the ring laser gyroscope on a chip 100A described above, the difference between the ring laser gyroscope on a chip 100B and the ring laser gyroscope on a chip 100A being that the ring laser gyroscope on a chip 100B includes a gain medium interaction region 114 in a gap in the first solid waveguide 102 instead of using the evanescent field. Specifically, the ring laser gyroscope on a chip 100B includes a first solid waveguide 102, an optional second solid waveguide 104, a photodetector 106, a non-solid Doppler-broadened gain medium 108 and at least one medium exciter (such as electrode 110 and electrode 112). In exemplary embodiments, the first solid waveguide 102 is circular shaped with at least one gap. The ring laser gyroscope on a chip 100B includes a gain medium interaction region 114 in the gap where light traveling through the first solid waveguide 102 interacts with the non-solid Doppler-broadened gain medium 108 molecules positioned outside of the first solid waveguide 102.

In exemplary embodiments, the gain medium interaction region 114 is in free space in the gap in the first solid waveguide 102. As with the ring laser gyroscope on a chip 100A above, the first solid waveguide 102 and/or the optional second solid waveguide 104 can be either on-substrate waveguides or optical fibers. In exemplary embodiments, light traveling in one direction exits the first solid waveguide at a first end of the gap, interacts with the non-solid Doppler-broadened gain medium 108 in the gain medium interaction region 114 and then couples back into the first solid waveguide at the second end of the gap. Similarly, light traveling in the other direction exits the first solid waveguide at the second end of the gap, interacts with the non-solid Doppler-broadened gain medium 108 in the gain medium interaction region 114 and then couples back into the first solid waveguide at the first end of the gap.

One potential hurdle with having the gap are back-reflections. In exemplary embodiments, the light coming out of the first solid waveguide needs to be focused enough so that it enters the other end of the waveguide after crossing the free space gas interaction region. Otherwise, the light would just spread out from the one end of the first solid waveguide 102 and not couple in well to the other end of the first solid waveguide 102. In exemplary embodiments, the ends of the first solid waveguide 102 on each side of the free space region include means for collimating and/or refocusing the light to avoid divergence of the light such that the light would actually couple back into the first solid waveguide 102. In exemplary embodiments, lenses, collimators, and or other focusing elements are used to couple light back into the other end of the first solid waveguide 102. In exemplary embodiments the ends of the first solid waveguide 102 are modified to form lenses, such as by melting the ends of the first solid waveguide 102 so it forms a ball or polishing the first solid waveguide 102 into a cone shape to form an axicon lens. In exemplary embodiments, similar things are done to the ends of the first solid waveguide 102 to form a lens and/or collimating element. In exemplary embodiments, the ends of the waveguide are shaped differently to have a similar effect of it acting as a lens.

In exemplary embodiments, as with the ring laser gyroscope on a chip 100A above, the non-solid Doppler-broadened gain medium 108 could be everywhere in the chamber 118, though it only interacts with the light at the gain medium interaction region 114 within the free-space section defined by the gap.

In exemplary embodiments, a processing device is configured to control the gyroscopes. In exemplary embodiments, the processing device includes or functions with software programs, firmware or other computer readable instructions for carrying out various methods, process tasks, calculations, and control functions, used in the gyroscopes. These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Figure 2:
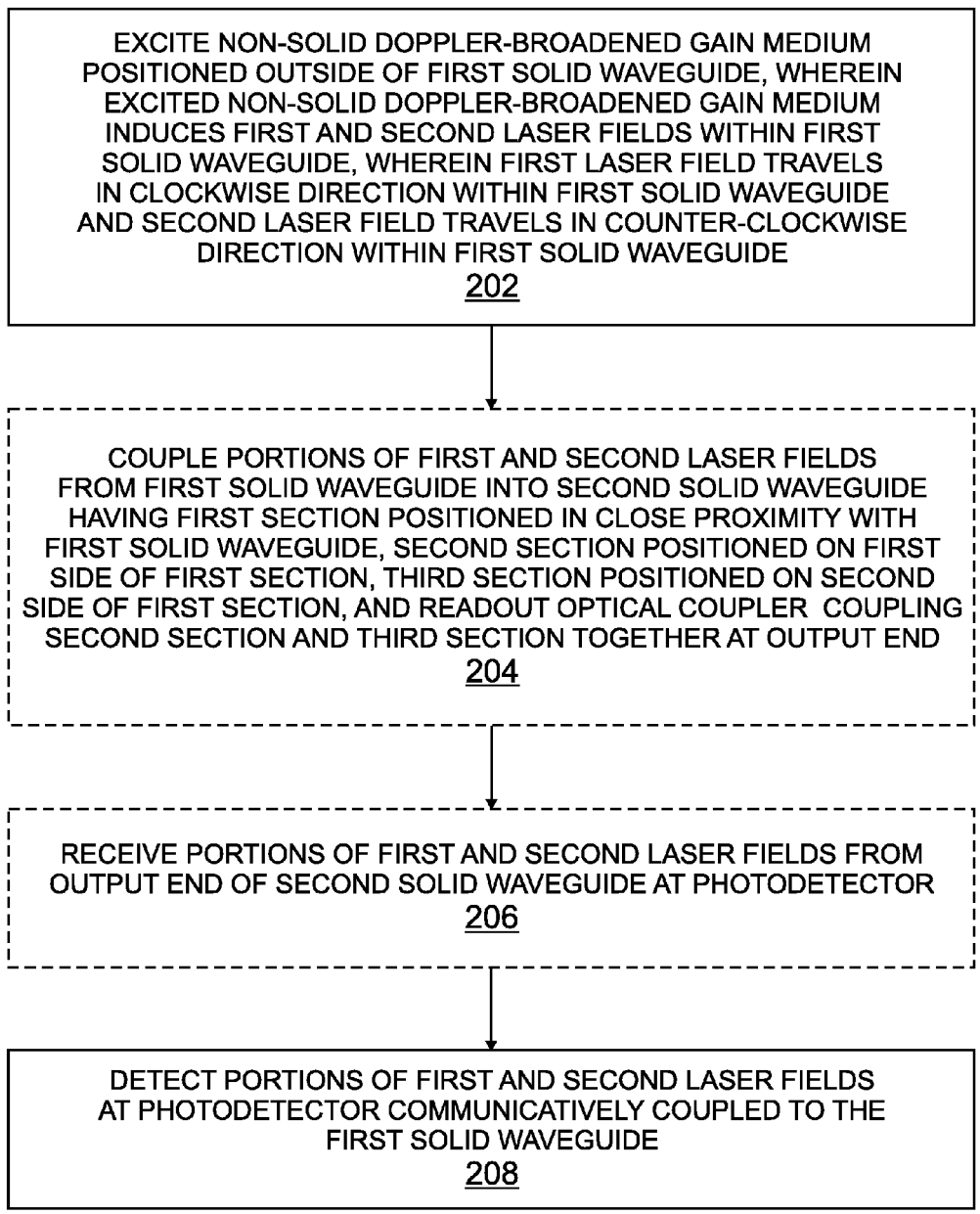
FIG. 2 is a flow diagram depicting one embodiment of a method of operating a ring laser gyroscope on a chip with Doppler-broadened gain medium.

FIG. 2 is a flow diagram depicting one embodiment of a method 200 of operating a ring laser gyroscope on a chip with Doppler-broadened gain medium. Method 200 begins at block 202 with exciting a non-solid Doppler-broadened gain medium positioned outside of a first solid waveguide, wherein the excited non-solid Doppler-broadened gain medium induces first and second laser fields within the first solid waveguide, wherein the first laser field travels in a clockwise direction within the first solid waveguide and the second laser field travels in a counter-clockwise direction within the first solid waveguide.

Method 200 proceeds to optional block 204 with coupling portions of the first and second laser fields from the first solid waveguide into an optional second solid waveguide having a first section positioned in close proximity with the first solid waveguide, a second section positioned on a first side of the first section, a third section positioned on a second side of the first section, and a readout optical coupler coupling the second section and the third section together at an output end. Method 200 proceeds to optional block 206 with receiving the portions of the first and second laser fields from output end of second solid waveguide at a photodetector. Method 200 proceeds to block 208 with detecting the portions of the first and second laser fields at the photodetector communicatively coupled to the first solid waveguide.

Although specific embodiments have been illustrated and described herein, it will be appreciated by those of ordinary skill in the art that any arrangement, which is calculated to achieve the same purpose, may be substituted for the specific embodiments shown. For example, although the exemplary embodiments described above operate using HeNe lasers, it is to be understood that other types of lasers could also be used. In addition. Therefore, it is manifestly intended that this invention be limited only by the claims and the equivalents thereof.

Example Embodiments

Example 1 includes a laser gyroscope comprising: a first solid waveguide; a gain medium interaction region where light traveling through the first solid waveguide interacts with non-solid Doppler-broadened gain medium molecules positioned outside of the first solid waveguide; at least one medium exciter configured to excite the non-solid Doppler-broadened gain medium at the gain medium interaction region, wherein the excited non-solid Doppler-broadened gain medium induces first and second laser fields within the first solid waveguide, wherein the first laser field travels in a clockwise direction within the first solid waveguide and the second laser field travels in a counter-clockwise direction within the first solid waveguide; and a photodetector communicatively coupled to the first solid waveguide and configured to detect the portions of the first and second laser fields.

Example 2 includes the laser gyroscope of Example 1, further comprising: wherein a second solid waveguide has a first section positioned in close proximity with the first solid waveguide, a second section positioned on a first side of the first section, a third section positioned on a second side of the first section, and a readout optical coupler coupling the second section and the third section together at an output end; wherein the second solid waveguide is configured to couple portions of the first and second laser fields from the first solid waveguide and into the output end; and wherein the photodetector is communicatively coupled to the first solid waveguide through the second solid waveguide.

Example 3 includes the laser gyroscope of any of Examples 1-2, wherein the gain medium interaction region surrounds a portion of the first solid waveguide with dimensions small enough to force energy from the first and second laser fields outside of the first solid waveguide into an evanescent mode where the first and second laser fields interact with the non-solid Doppler-broadened gain medium molecules positioned outside the first solid waveguide.

Example 4 includes the laser gyroscope of any of Examples 1-3, wherein the first solid waveguide is a closed path except for a gap positioned between a first end of the first solid waveguide and a second end of the first solid waveguide; and wherein the gain medium interaction region is positioned in the gap positioned between the first end of the first solid waveguide and the second end of the first solid waveguide.

Example 5 includes the laser gyroscope of any of Examples 1-4, wherein the first solid waveguide is deposited on a substrate.

Example 6 includes the laser gyroscope of any of Examples 1-4, wherein the first solid waveguide is an optical fiber.

Example 7 includes the laser gyroscope of any of Examples 1-6, wherein the at least one medium exciter comprises at least one radio frequency discharge device that drives radio frequency electromagnetic radiation through the non-solid Doppler-broadened gain medium.

Example 8 includes the laser gyroscope of any of Examples 1-7, wherein the at least one medium exciter comprises at least one current generating device that applies a current across the non-solid Doppler-broadened gain medium.

Example 9 includes the laser gyroscope of any of Examples 1-8, wherein the non-solid Doppler-broadened gain medium is at least one of a gas and a plasma.

Example 10 includes the laser gyroscope of any of Examples 1-9, further comprising: at least one magnetic dithering device configured to apply alternating current to the first solid waveguide to create a magnetic field configured to change the rate of at least one of the first and second laser fields through the first solid waveguide through at least one of Faraday rotation and birefringence in the first solid waveguide.

Example 11 includes a method comprising: exciting a non-solid Doppler-broadened gain medium positioned outside of a first solid waveguide, wherein the excited non-solid Doppler-broadened gain medium induces first and second laser fields within the first solid waveguide, wherein the first laser field travels in a clockwise direction within the first solid waveguide and the second laser field travels in a counter-clockwise direction within the first solid waveguide; and detecting the portions of the first and second laser fields at a photodetector communicatively coupled to the first solid waveguide.

Example 12 includes the method of Example 11, further comprising: coupling portions of the first and second laser fields from the first solid waveguide into a second solid waveguide having a first section positioned in close proximity with the first solid waveguide, a second section positioned on a first side of the first section, a third section positioned on a second side of the first section, and a readout optical coupler coupling the second section and the third section together at an output end; and receiving the portions of the first and second laser fields from the output end of the second solid waveguide at the photodetector.

Example 13 includes the method of any of Examples 11-12, wherein the gain medium interaction region surrounds a portion of the first solid waveguide with dimensions small enough to force energy from the first and second laser fields outside of the first solid waveguide into an evanescent mode where the first and second laser fields interact with the non-solid Doppler-broadened gain medium molecules positioned outside the first solid waveguide.

Example 14 includes the method of any of Examples 11-13, wherein the first solid waveguide is circular shaped with a gap positioned between a first end of the first solid waveguide and a second end of the first solid waveguide; and wherein the gain medium interaction region is positioned in the gap positioned between the first end of the first solid waveguide and the second end of the first solid waveguide.

Example 15 includes the method of any of Examples 11-14, wherein the first solid waveguide is deposited on a substrate.

Example 16 includes the method of any of Examples 11-14, wherein the first solid waveguide is an optical fiber.

Example 17 includes the method of any of Examples 11-16, wherein exciting the non-solid Doppler-broadened gain medium comprises driving radio frequency electromagnetic radiation through the non-solid Doppler-broadened gain medium.

Example 18 includes the method of any of Examples 11-17, wherein exciting the non-solid Doppler-broadened gain medium comprises applying a current across a portion of the non-solid Doppler-broadened gain medium.

Example 19 includes the method of any of Examples 11-18, further comprising: applying alternating current to the first solid waveguide to create a magnetic field configured to change the rate of at least one of the first and second laser fields through the first solid waveguide through at least one of Faraday rotation and birefringence in the first solid waveguide.

Example 20 includes a laser gyroscope comprising: a first solid waveguide deposited on a substrate, where the first solid waveguide is circular shaped with no gaps; a gain medium interaction region where light traveling through the first solid waveguide interacts with non-solid Doppler-broadened gain medium molecules positioned outside of the first solid waveguide, wherein the non-solid Doppler-broadened gain medium is at least one of a gas and a plasma; at least one medium exciter configured to excite the non-solid Doppler-broadened gain medium at the gain medium interaction region, wherein the excited non-solid Doppler-broadened gain medium induces first and second laser fields within the first solid waveguide, wherein the first laser field travels in a clockwise direction within the first solid waveguide and the second laser field travels in a counter-clockwise direction within the first solid waveguide, wherein the at least one medium excited comprises at least one current generating device that applies a current across the non-solid Doppler-broadened gain medium; wherein the gain medium interaction region surrounds a portion of the first solid waveguide with dimensions small enough to force energy from the first and second laser fields outside of the first solid waveguide into an evanescent mode where the first and second laser fields interact with the non-solid Doppler-broadened gain medium molecules positioned outside the first solid waveguide; a second solid waveguide deposited on the substrate and having a first section positioned in close proximity with the first solid waveguide, a second section positioned on a first side of the first section, a third section positioned on a second side of the first section, and a readout optical coupler coupling the second section and the third section together at an output end; wherein the second solid waveguide is configured to couple portions of the first and second laser fields from the first solid waveguide and into the output end; and a photodetector communicatively coupled to the readout optical coupler at the output end and configured to detect the portions of the first and second laser fields.

What is claimed is:

1. A laser gyroscope comprising:
   a first solid waveguide;
   a gain medium interaction region where light traveling through the first solid waveguide interacts with non-solid Doppler-broadened gain medium molecules positioned outside of the first solid waveguide;
   at least one medium exciter configured to excite the non-solid Doppler-broadened gain medium at the gain medium interaction region, wherein the excited non-solid Doppler-broadened gain medium induces first and second laser fields within the first solid waveguide, wherein the first laser field travels in a clockwise direction within the first solid waveguide and the second laser field travels in a counter-clockwise direction within the first solid waveguide;
   wherein the gain medium interaction region causes energy from the first and second laser fields to travel outside of the first solid waveguide into an evanescent mode where the first and second laser fields interact with the non-solid Doppler-broadened gain medium molecules positioned outside the first solid waveguide;
   a second solid waveguide having a first section positioned in close proximity with the first solid waveguide, a second section positioned on a first side of the first section, a third section positioned on a second side of the first section, and a readout optical coupler coupling the second section and the third section together at an output end;
   wherein the second solid waveguide is configured to couple portions of the first and second laser fields from the first solid waveguide and into the output end; and
   a photodetector communicatively coupled to the readout optical coupler at the output end and configured to detect the portions of the first and second laser fields.

2. The laser gyroscope of claim 1, wherein the gain medium interaction region surrounds a portion of the first solid waveguide with dimensions small enough to force energy from the first and second laser fields outside of the first solid waveguide into the evanescent mode where the first and second laser fields interact with the non-solid Doppler-broadened gain medium molecules positioned outside the first solid waveguide.

3. The laser gyroscope of claim 1, wherein the first solid waveguide is a closed path except for a gap positioned between a first end of the first solid waveguide and a second end of the first solid waveguide; and
   wherein the gain medium interaction region is positioned in the gap positioned between the first end of the first solid waveguide and the second end of the first solid waveguide.

4. The laser gyroscope of claim 1, wherein the first solid waveguide is deposited on a substrate.

5. The laser gyroscope of claim 1, wherein the first solid waveguide is an optical fiber.

6. The laser gyroscope of claim 1, wherein the at least one medium exciter comprises at least one radio frequency discharge device that drives radio frequency electromagnetic radiation through the non-solid Doppler-broadened gain medium.

7. The laser gyroscope of claim 1, wherein the at least one medium exciter comprises at least one current generating device that applies a current across the non-solid Doppler-broadened gain medium.

8. The laser gyroscope of claim 1, wherein the non-solid Doppler-broadened gain medium is at least one of a gas and a plasma.

9. The laser gyroscope of claim 1, further comprising:
   at least one magnetic dithering device configured to apply alternating current to the first solid waveguide to create a magnetic field configured to change the rate of at least one of the first and second laser fields through the first solid waveguide through at least one of Faraday rotation and birefringence in the first solid waveguide.

10. A method comprising:
    exciting a non-solid Doppler-broadened gain medium positioned outside of a first solid waveguide, wherein the excited non-solid Doppler-broadened gain medium induces first and second laser fields within the first solid waveguide, wherein the first laser field travels in a clockwise direction within the first solid waveguide and the second laser field travels in a counter-clockwise direction within the first solid waveguide;
    wherein the gain medium interaction region causes energy from the first and second laser fields to travel outside of the first solid waveguide into an evanescent mode where the first and second laser fields interact with the non-solid Doppler-broadened gain medium molecules positioned outside the first solid waveguide;
    coupling portions of the first and second laser fields from the first solid waveguide into a second solid waveguide having a first section positioned in close proximity with the first solid waveguide, a second section positioned on a first side of the first section, a third section positioned on a second side of the first section, and a readout optical coupler coupling the second section and the third section together at an output end;
    receiving the portions of the first and second laser fields from the output end of the second solid waveguide at a photodetector; and
    detecting the portions of the first and second laser fields at the photodetector communicatively coupled to the first solid waveguide.

11. The method of claim 10, wherein the gain medium interaction region surrounds a portion of the first solid waveguide with dimensions small enough to force energy from the first and second laser fields outside of the first solid waveguide into the evanescent mode where the first and second laser fields interact with the non-solid Doppler-broadened gain medium molecules positioned outside the first solid waveguide.

12. The method of claim 10, wherein the first solid waveguide includes a gap positioned between a first end of the first solid waveguide and a second end of the first solid waveguide; and
    wherein the gain medium interaction region is positioned in the gap positioned between the first end of the first solid waveguide and the second end of the first solid waveguide.

13. The method of claim 10, wherein the first solid waveguide is deposited on a substrate.

14. The method of claim 10, wherein the first solid waveguide is an optical fiber.

15. The method of claim 10, wherein exciting the non-solid Doppler-broadened gain medium comprises driving radio frequency electromagnetic radiation through the non-solid Doppler-broadened gain medium.

16. The method of claim 10, wherein exciting the non-solid Doppler-broadened gain medium comprises applying a current across a portion of the non-solid Doppler-broadened gain medium.

17. The method of claim 10, further comprising:

applying alternating current to the first solid waveguide to create a magnetic field configured to change the rate of at least one of the first and second laser fields through the first solid waveguide through at least one of Faraday rotation and birefringence in the first solid waveguide.

18. A laser gyroscope comprising:

a first solid waveguide deposited on a substrate, where the first solid waveguide includes no gaps;

a gain medium interaction region where light traveling through the first solid waveguide interacts with non-solid Doppler-broadened gain medium molecules positioned outside of the first solid waveguide, wherein the non-solid Doppler-broadened gain medium is at least one of a gas and a plasma;

at least one medium exciter configured to excite the non-solid Doppler-broadened gain medium at the gain medium interaction region, wherein the excited non-solid Doppler-broadened gain medium induces first and second laser fields within the first solid waveguide, wherein the first laser field travels in a clockwise direction within the first solid waveguide and the second laser field travels in a counter-clockwise direction within the first solid waveguide;

wherein the gain medium interaction region causes energy from the first and second laser fields to travel outside of the first solid waveguide into an evanescent mode where the first and second laser fields interact with the non-solid Doppler-broadened gain medium molecules positioned outside the first solid waveguide;

a second solid waveguide deposited on the substrate and having a first section positioned in close proximity with the first solid waveguide, a second section positioned on a first side of the first section, a third section positioned on a second side of the first section, and a readout optical coupler coupling the second section and the third section together at an output end;

wherein the second solid waveguide is configured to couple portions of the first and second laser fields from the first solid waveguide and into the output end; and a photodetector communicatively coupled to the readout optical coupler at the output end and configured to detect the portions of the first and second laser fields.

\* \* \* \* \*